US011608940B2

(12) United States Patent
Villette et al.

(10) Patent No.: US 11,608,940 B2
(45) Date of Patent: Mar. 21, 2023

(54) PASSIVE THERMAL DIODE FOR TRANSPORTATION PIPELINES USING CONTACT SWITCH BASED ON POLYMER THERMAL EXPANSION (PTE-PTD)

(71) Applicant: Saudi Arabian Oil Company, Dhahran (SA)

(72) Inventors: Thibault Tarik Villette, Al-Khobar (SA); Guillaume Robert Jean-Francois Raynel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 314 days.

(21) Appl. No.: 17/009,579

(22) Filed: Sep. 1, 2020

(65) Prior Publication Data
US 2022/0065402 A1 Mar. 3, 2022

(51) Int. Cl.
*F16L 59/07* (2006.01)
*F17D 1/18* (2006.01)
(Continued)

(52) U.S. Cl.
CPC ............... *F17D 1/18* (2013.01); *F16L 53/38* (2018.01); *F16L 58/1063* (2013.01); *F16L 59/07* (2013.01)

(58) Field of Classification Search
CPC .... F16L 58/1054; F16L 59/028; B32B 27/40; B32B 27/32; B32B 59/00; B32B 59/07; B32B 59/021–024
(Continued)

(56) References Cited

U.S. PATENT DOCUMENTS 2,941,570 A   6/1960  Plym
3,162,895 A   12/1964 Pusch
(Continued)

FOREIGN PATENT DOCUMENTS

AU    2016214075    2/2020
CN    205534838     8/2016
(Continued)

OTHER PUBLICATIONS

PCT International Search Report and Written Opinion in International Appln. No. PCT/US2021/048647, dated Dec. 22, 2021, 13 pages.
(Continued)

*Primary Examiner* — Patrick F Brinson
(74) *Attorney, Agent, or Firm* — Fish & Richardson P.C.

(57) ABSTRACT

An apparatus includes a Polymer Thermal Expansion Based Passive Thermal Diode (PTE-PTD) that includes layers and is configured to provide passive heating and cooling of a pipeline. A polyurethane (PU) layer is provided that is configured to contact at least an upper portion along a length of a pipe. A polyethylene terephthalate (PET) layer is provided that is configured to surround the PU layer and the length of the pipe. A graphene layer is provided that is configured to surround an epoxy layer. An epoxy shell is provided that is configured to surround the graphene layer. An air gap on a first side of the PTE-PTD is provided. The air gap is formed by a void in the PET layer and is configured to provide additional air space between the PET layer and the PU layer. The air gap provides an upward movement of the PET layer using opposite forces of alternate sides of the PET layer. The PTE-PTD is installed on the pipeline.

20 Claims, 11 Drawing Sheets

(51) Int. Cl.
*F16L 53/38* (2018.01)
*F16L 58/10* (2006.01)

(58) Field of Classification Search
USPC ........ 138/149, 146, 141, 140, 137, 151, 158
See application file for complete search history.

(56) References Cited

U.S. PATENT DOCUMENTS

| | | | |
|---|---|---|---|
| 3,899,913 | A | 8/1975 | Schlosser et al. |
| 3,982,564 | A | 9/1976 | Clabburn et al. |
| 3,984,906 | A | 10/1976 | Schlosser et al. |
| 4,084,306 | A | 4/1978 | Barker |
| 5,934,337 | A | 8/1999 | Fiala et al. |
| 7,036,531 | B2 | 5/2006 | Manini et al. |
| 7,393,427 | B2 | 7/2008 | Bright et al. |
| 8,397,765 | B2 | 3/2013 | Jackson et al. |
| 9,435,571 | B2 | 9/2016 | Ghoshal et al. |
| 9,863,571 | B2 | 1/2018 | Critsinelis et al. |
| 2006/0231193 | A1 | 10/2006 | Bright et al. |
| 2010/0260551 | A1 | 10/2010 | Jespersen et al. |
| 2011/0073206 | A1 | 3/2011 | Na |
| 2016/0018049 | A1 | 1/2016 | Yodogawa et al. |
| 2019/0027615 | A1 | 1/2019 | Zheng et al. |
| 2021/0172689 | A1* | 6/2021 | Villette ................... F16L 59/07 |

FOREIGN PATENT DOCUMENTS

| | | |
|---|---|---|
| CN | 109882683 | 6/2019 |
| CN | 110280941 | 9/2019 |
| CN | 110711995 | 1/2020 |
| CN | 111365568 | 7/2020 |
| EP | 3254010 | 12/2017 |
| KR | 20110134562 | 12/2011 |
| WO | WO 2009111008 | 9/2009 |
| WO | WO 2017008748 | 1/2017 |
| WO | WO 2018097718 | 5/2018 |
| WO | WO 2021113572 | 6/2021 |

OTHER PUBLICATIONS masterbond.com [online], "Epoxies with Low Coefficient of Thermal Expansion," available on or before May 12, 2015, via Internet Archive: Wayback Machine URL: <https://web.archive.org/web/20150512012852/https://www.masterbond.com/properties/epoxies-low-coefficient-thermal-expansion>, retrieved on Sep. 15, 2020, URL: <https://www.masterbond.com/properties/epoxies-low-coefficient-thermal-expansion>, 2 pages.
U.S. Appl. No. 16/704,973, Villete et al., filed Dec. 15, 2019.
U.S. Appl. No. 17/009,573, Villete et al., filed Sep. 1, 2020.
U.S. Appl. No. 17/103,685, Villete et al., filed Nov. 24, 2020.
PCT International Search Report and Written Opinion in International Appln. No. PCT/US2021/048378, dated Jan. 5, 2022, 14 pages.
PCT International Search Report and Written Opinion in International Appln. No. PCT/US2021/048646, dated Jan. 5, 2022, 14 pages.

* cited by examiner

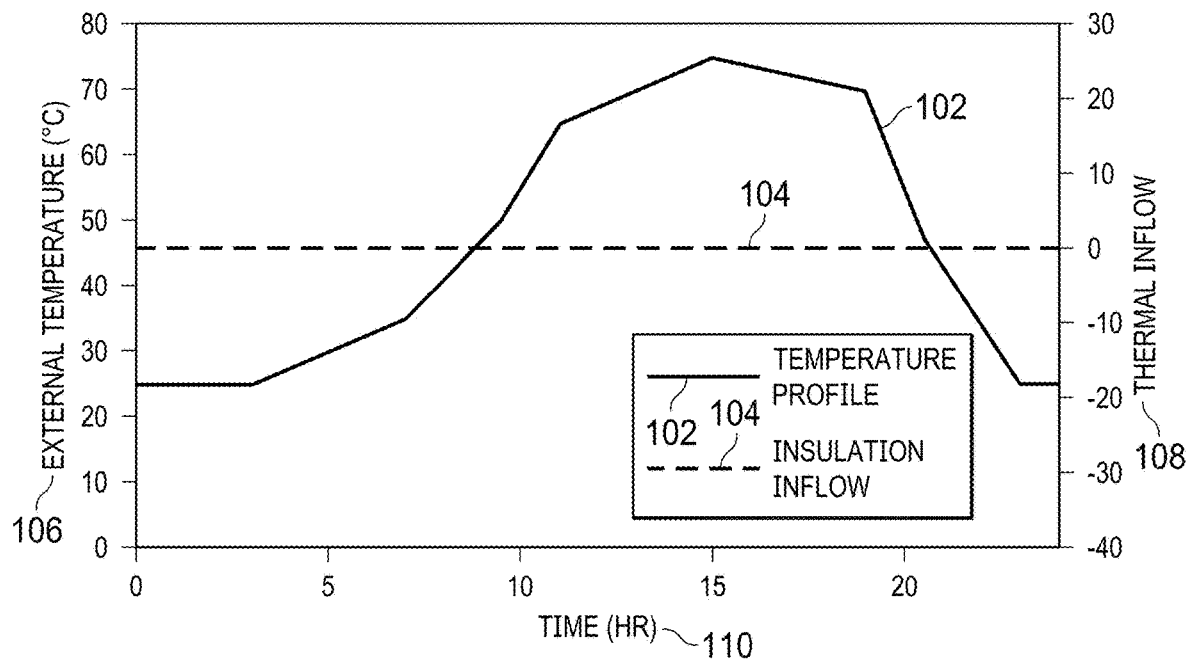
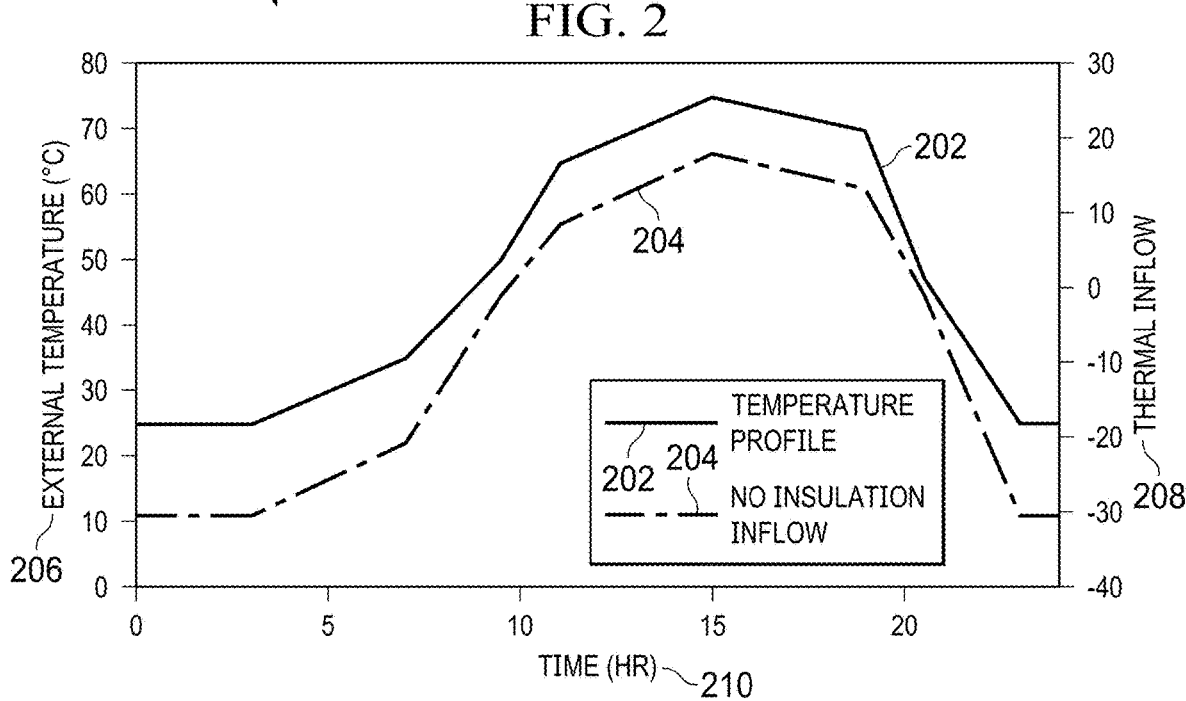

PASSIVE THERMAL DIODE FOR TRANSPORTATION PIPELINES USING CONTACT SWITCH BASED ON POLYMER THERMAL EXPANSION (PTE-PTD)

BACKGROUND

The present disclosure applies to techniques for improving the flow in pipelines.

Once extracted from a well, wet crude oil is transported to be processed in Gas and Oil Separation Plants (GOSPs). Subsequently, the export crude oil is sent to refineries for processing, or to tank farm terminals (TFTs) for storing or shipping, through pipelines system using electromechanical pumps. The flow of these fluids, wet crude oil, and export crude oil, is facilitated by a decrease of viscosity. As viscosity decreases, the temperature of the fluid increases. Thus, keeping the fluids warm is beneficial in order to assure the flow of these fluids. Greater temperatures decrease the energy consumption of the pump (by decreasing the pumping load). This increases the longevity and durability of the rotating equipment (by decreasing potential damage, damage propagation, fatigue, and creep).

SUMMARY

The present disclosure describes techniques that can be used for a Polymer Thermal Expansion Based Passive Thermal Diode (PTE-PTD). In some implementations, an apparatus includes a Polymer Thermal Expansion Based Passive Thermal Diode (PTE-PTD) that includes layers and is configured to provide passive heating and cooling of a pipeline. A polyurethane (PU) layer is provided that is configured to contact at least an upper portion along a length of a pipe. A polyethylene terephthalate (PET) layer is provided that is configured to surround the PU layer and the length of the pipe. A graphene layer is provided that is configured to surround an epoxy layer. An epoxy shell is provided that is configured to surround the graphene layer. An air gap on a first side of the PTE-PTD is provided. The air gap is formed by a void in the PET layer and is configured to provide additional air space between the PET layer and the PU layer. The air gap provides an upward movement of the PET layer using opposite forces of alternate sides of the PET layer. The PTE-PTD is installed on the pipeline.

Some implementations, such as for the manufacture and installation of the apparatus described in the present disclosure, can use computer-implemented methods and computer-implemented systems, including a computer memory interoperably coupled with a hardware processor configured to perform the computer-implemented method and corresponding instructions stored on a non-transitory, computer-readable medium.

The subject matter described in this specification can be implemented in particular implementations, so as to realize one or more of the following advantages. First, techniques are provided to passively control viscosity in crude transportation systems, including passive increasing fluid temperature. Second, the techniques combine the advantages of using insulation to wrap the pipeline to avoid thermal leaks at low temperatures and the absence of insulation at higher temperatures to retain the fluid's viscosity. For example, this combines the advantages of an insulator (to avoid thermal outflow at low external temperatures such as during the night) and the absence of an insulator (to benefit from thermal inflow at higher external temperatures). Third, PTE-PTD techniques can also be applied to above ground steel pipelines while controlling low temperatures impacting fluid's viscosity that may impact the load of pump stations. Fourth, techniques maximize the thermal inflow over a daily temperature cycle. Fifth, various configurations can be used to find a practical way for elaborating the passive thermal diode for pipelines using contact switch based on Polymer Thermal Expansion. Sixth, the techniques can consider the synergistic effects of thermal expansion of a standard polymer with a Polymer Thermal Expansion. Seventh, the techniques can provide highly-maximized daily thermal inflow, reduce the need for an active heat exchanger, eliminate the need for a power supply (and the hazard of a nearby power source), provide easy assembly, and increase the impact of pump durability.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIG. 1 is a graph showing an example of a thermal inflow profile of an insulator on a diurnal temperature cycle, according to some implementations of the present disclosure.

FIG. 2 is a graph showing an example of a thermal inflow profile with no insulation on a diurnal temperature cycle, according to some implementations of the present disclosure.

Like reference numbers and designations in the various drawings indicate like elements.

DETAILED DESCRIPTION

The following detailed description describes a Polymer Thermal Expansion Based Passive Thermal Diode (PTE-PTD) apparatus. For example, the PTE-PTD can serve as a multi-layer sleeve that is wrapped around a pipeline and pinned along the top of the pipeline to complete installation. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The techniques described in the present disclosure can be used to passively maximize the thermal flow going into the pipeline. This can lead to increasing or maintaining the temperature of a fluid being transported in the pipeline, while minimizing the thermal flow leaving the pipeline. The techniques can be used, for example, in pipeline providing oil and gas transportation.

Numerical analysis can show that the arrangement of the selected materials described with reference to designs of the present disclosure can accommodate external changes in temperature in an efficient way. This includes generating a displacement greater than the 5 millimeter (mm) air gap located at the bottom of the system.

The solution described here combines the advantages of an insulator (for example, to avoid thermal outflow at low external temperatures such as during the night) and the absence of an insulator (for example, to benefit from thermal inflow at higher external temperatures). As a result, the techniques can maximize the thermal inflow over a diurnal temperature cycle.

Figure 6:
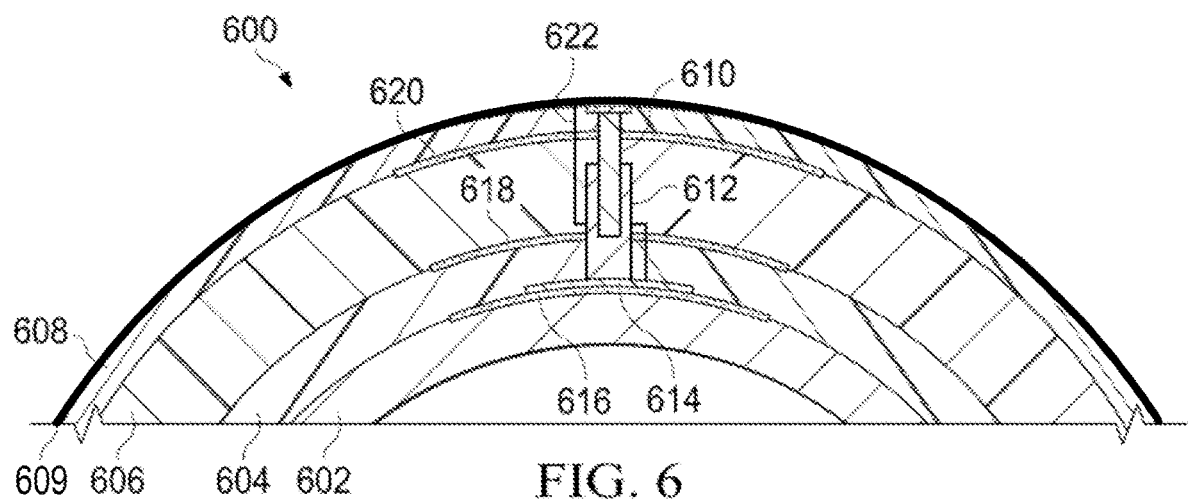
FIG. 6 is a cross-sectional view showing examples of contacts between components of the anchoring system for the PTE-PTD, according to some implementations of the present disclosure.

FIG. 6 is a graph showing an example of a thermal inflow profile 100 of an insulator on a diurnal temperature cycle, according to some implementations of the present disclosure. In this example, the total thermal inflow is equal to zero. The thermal inflow profile 100 includes a temperature profile 102 and an insulation profile 104. Profiles of the thermal inflow profile 100 are plotted relative to an external temperature axis 106 (for example, in degrees Celsius (° C.)), a thermal inflow axis 108, and a time axis 110 (for example, in hours (hr)).

A typical thermal insulation exhibits "no flow" characteristics with respect to time of the day and temperature, as shown in FIG. 1. Therefore, the total thermal inflow over a full day is zero (or close to zero). The insulation is able to limit thermal outflow during both low temperatures of the night and high temperatures of the day. Heat provided during the day warms the fluid and decreases the fluid's viscosity.

Figure 7:
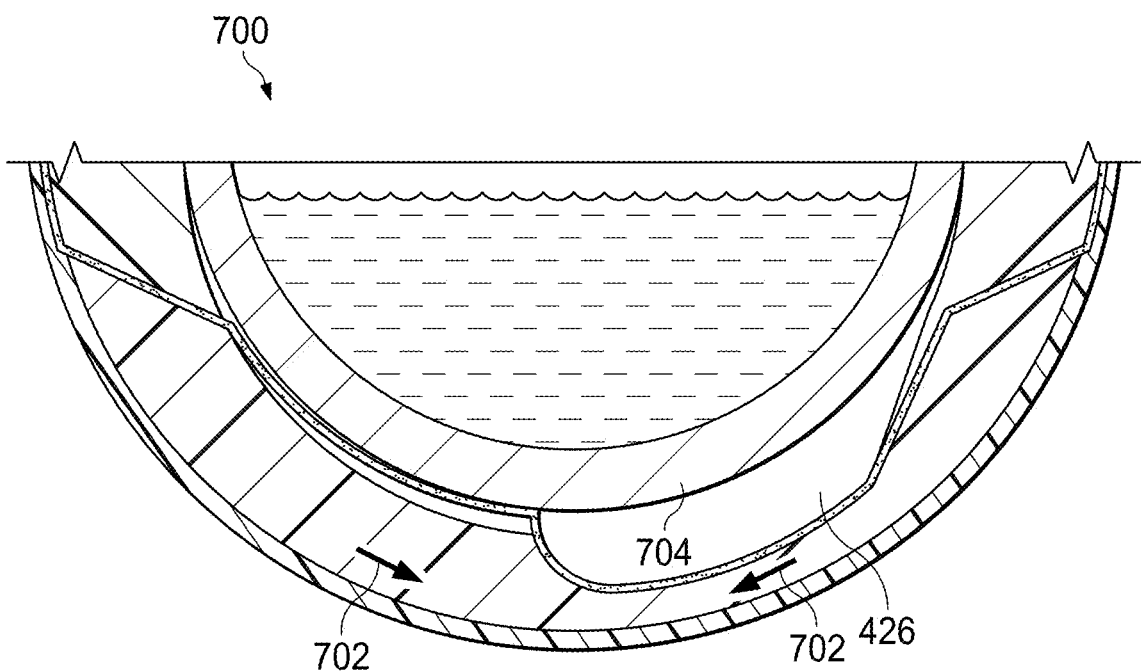
FIG. 7 is a cross-sectional view showing examples of mechanisms used for contact between a graphene web and the pipe, according to some implementations of the present disclosure.

FIG. 7 is a graph showing an example of a thermal inflow profile 200 with no insulation on a diurnal temperature cycle, according to some implementations of the present disclosure. In this example, the total thermal inflow~0. The thermal inflow profile 200 includes a temperature profile 202 and a no insulation profile 204. Profiles of the thermal inflow profile 200 are plotted relative to an external temperature axis 206 (for example, in degrees Celsius (° C.)), a thermal inflow axis 208, and a time axis 210 (for example, in hours).

In the absence of thermal insulation, the thermal inflow has a different shape, as no thermal resistance is opposed to heat flow, as shown in FIG. 2. The fluid experiences cycle variation of thermal inflow, which causes changes to its viscosity. The total thermal inflow is different than zero, which alter the fluid's viscosity.

Figure 8A:
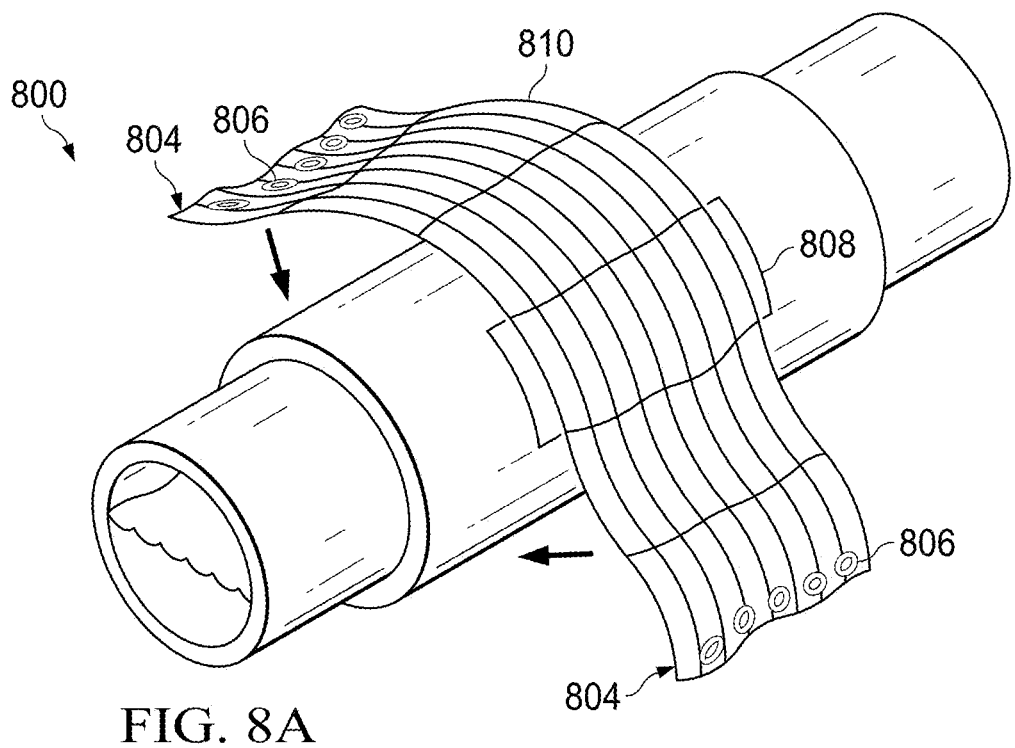
FIGS. 8A and 8B provide three-dimensional views illustrating an example of an installation of an external graphene web around the PTE-PTD, according to some implementations of the present disclosure.

FIG. 8 is a graph showing an example of a thermal inflow profile 300 with a passive thermal diode on a diurnal temperature cycle, according to some implementations of the present disclosure. In this example, the total thermal inflow>>0. The thermal inflow profile 300 includes a temperature profile 302 and passive thermal rectifier thermal inflow 304. Profiles of the thermal inflow profile 300 are plotted relative to an external temperature axis 306 (for example, in degrees Celsius (° C.)), a thermal inflow axis 308, and a time axis 310 (for example, in hours).

Figure 3:
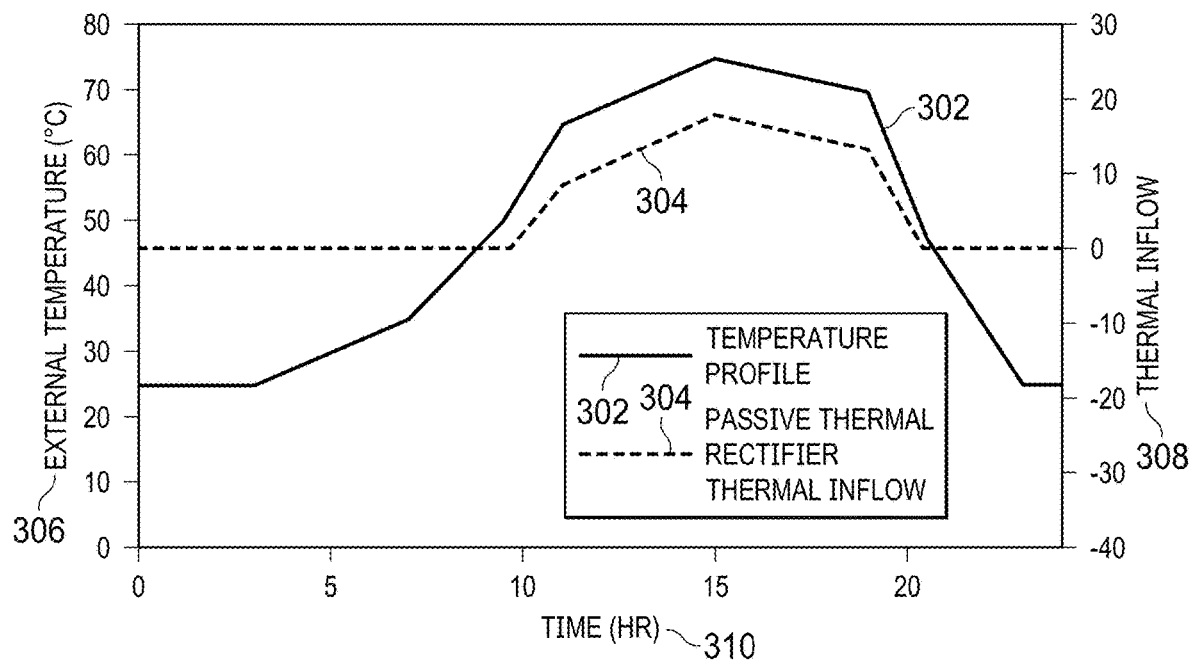
FIG. 3 is a graph showing an example of a thermal inflow profile with a passive thermal diode on a diurnal temperature cycle, according to some implementations of the present disclosure.

With a passive thermal diode, the pipelines can benefit of a positive thermal inflow during the day and "no flow" during the night, which corresponds to a total positive inflow over one diurnal cycle, as shown in FIG. 3. In some implementations, a set-up of this passive thermal diode can include using a contact switch based on the thermal expansion of polymer (or material).

Figure 9:
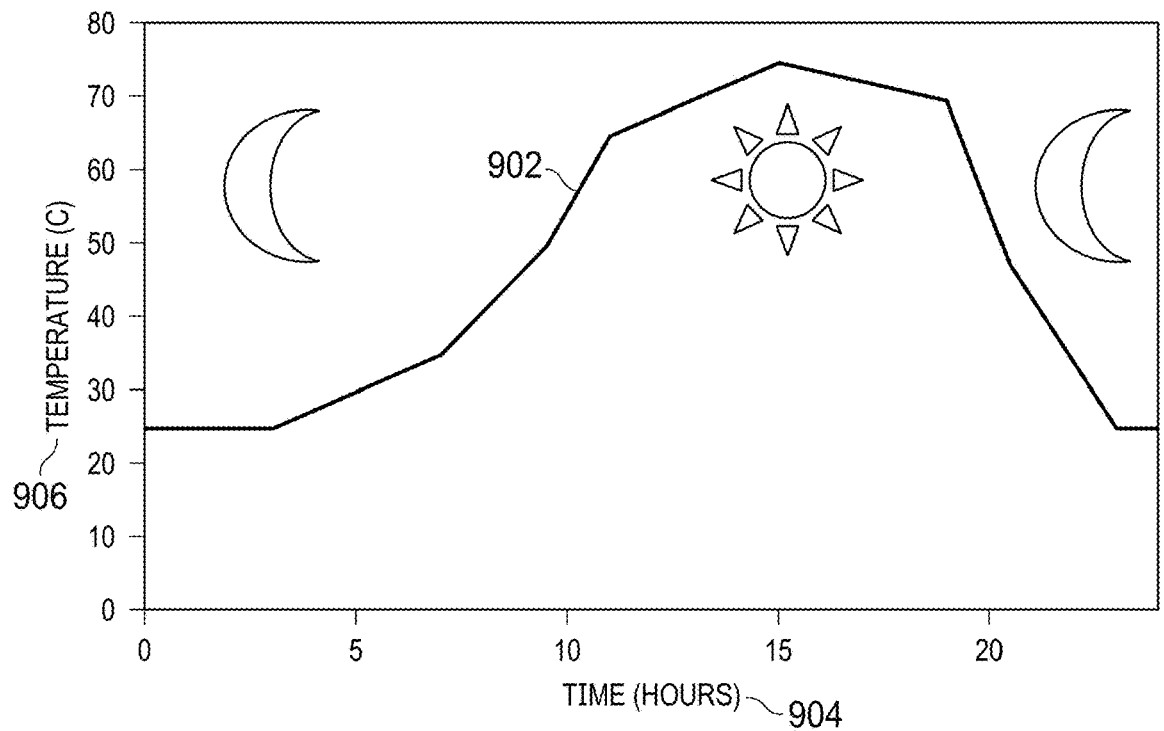
FIG. 9 is a graph showing an example of a temperature profile of a diurnal cycle, according to some implementations of the present disclosure.

FIG. 9 is a cross sectional view of an example of a section of the PTE-PTD 400, according to some implementations of the present disclosure. The PTE-PTD 400 can provide the following.

Components of the PTE-PTD 400 include an assembly system 402, bonding 404, a low friction contacts 406, left and right polyethylene terephthalate (PET) blocks 408a and 408b, and a sliding contact 410. The PTE-PTD 400 transports transported fluid 412 (for example, oil). Layers of the PTE-PTD 400 include a graphene layer 414 (for example 4 mm thick), a PET layer 414 (for example 20 mm thick), a polyurethane (PU) layer 416 (for example 10 mm thick), a PET layer 418 (for example 20 mm thick), a PU layer 420 (for example 10 mm thick), and a steel pipe 422 (for example, 12.5 mm thick). The assembly system 402 further includes a small air gap 424 (for example, 5 mm), a large air gap 426 (for example, 20 mm), and a small path 425 through the PET blocks. The large air gap 426 can result from a thinner wall of the right PET block 408b. The assembly system 402 can be manufactured with the large air block 426 on either the right side (as shown in FIG. 4) or the left side.

The temperature of the transported fluid increases when the temperature of the surrounding environment is greater than a fixed temperature of deformation of the material (called hereafter Tt). This temperature is close to the desired temperature of the fluid. The heat transfer between the fluid and the environment is cut when the outside temperature falls below Tt. As a result, the viscosity of the fluid drops when outside temperature is higher than Tt. Also, the low viscosity is maintained, or increases very slightly, when the environment is colder than Tt (for example, during the night).

The PTE-PTD 400 does not need a power supply to be activated. For this reason, the PTE-PTD 400 can be described as a passive thermal diode, providing a way to maximize thermal flow going from outside to inside the pipeline and minimize thermal flow leaving the pipeline.

Figure 4:
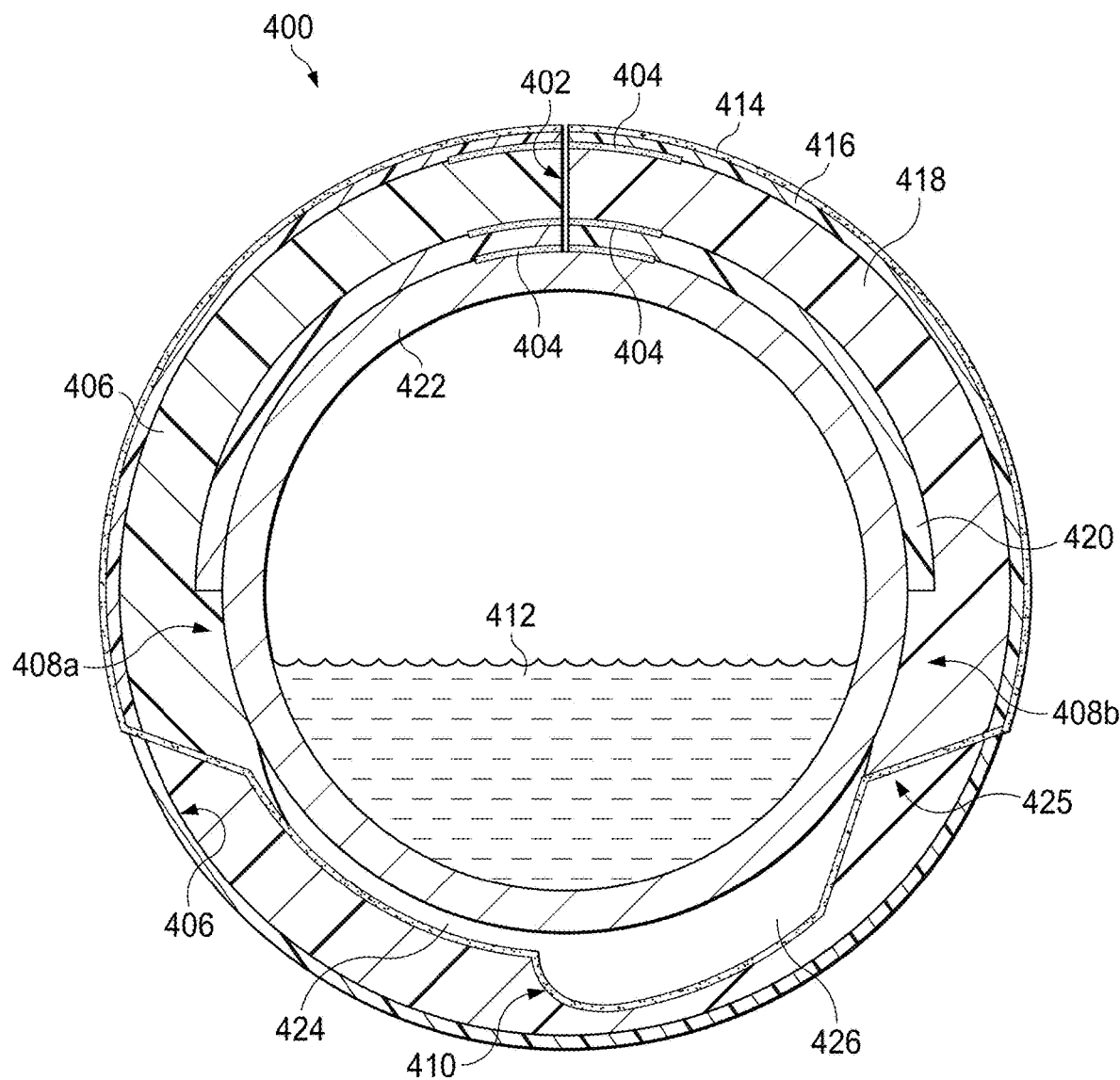
FIG. 4 is a cross sectional view of an example of a section of the Polymer Thermal Expansion Based Passive Thermal Diode (PTE-PTD), according to some implementations of the present disclosure.
Figure 5:
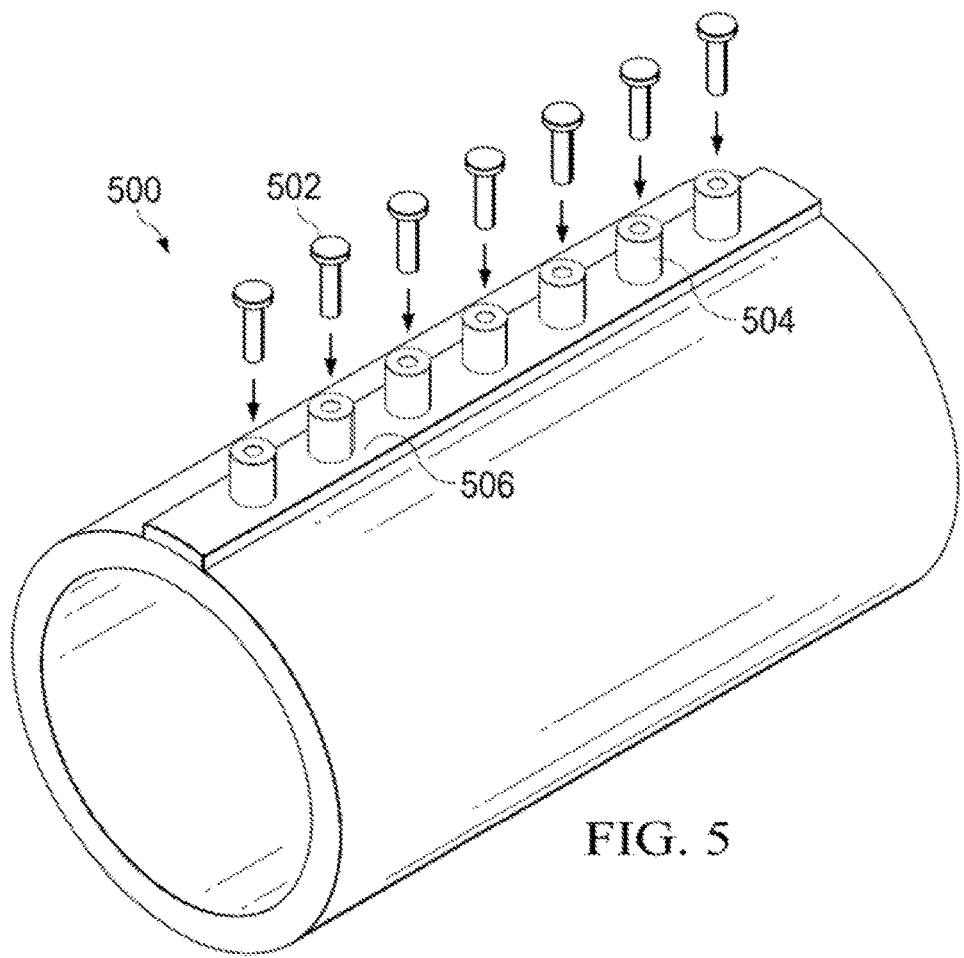
FIG. 5 is a three-dimensional view of an example of an anchoring system for the PTE-PTD, according to some implementations of the present disclosure.

The PU layer aims at providing insulation to the pipeline to avoid thermal leaks through the PET blocks (FIG. 4). The bottom of the PTE-PTD does not require a PU layer as the insulation is provided through an air gap. The "assembly system" at the top of the PTE-PTD allows the system to be mounted onto the pipeline and to give an anchor point to the moving parts of the PTE-PTD. Small cavities are designed on each side of the PTE-PTD in order for the graphene web to access the air gap located between the pipeline and bottom components. Cavities are small enough not to compromise structural integrity of the system. The graphene web is folded in order to fit through the cavities.

Figure 10:
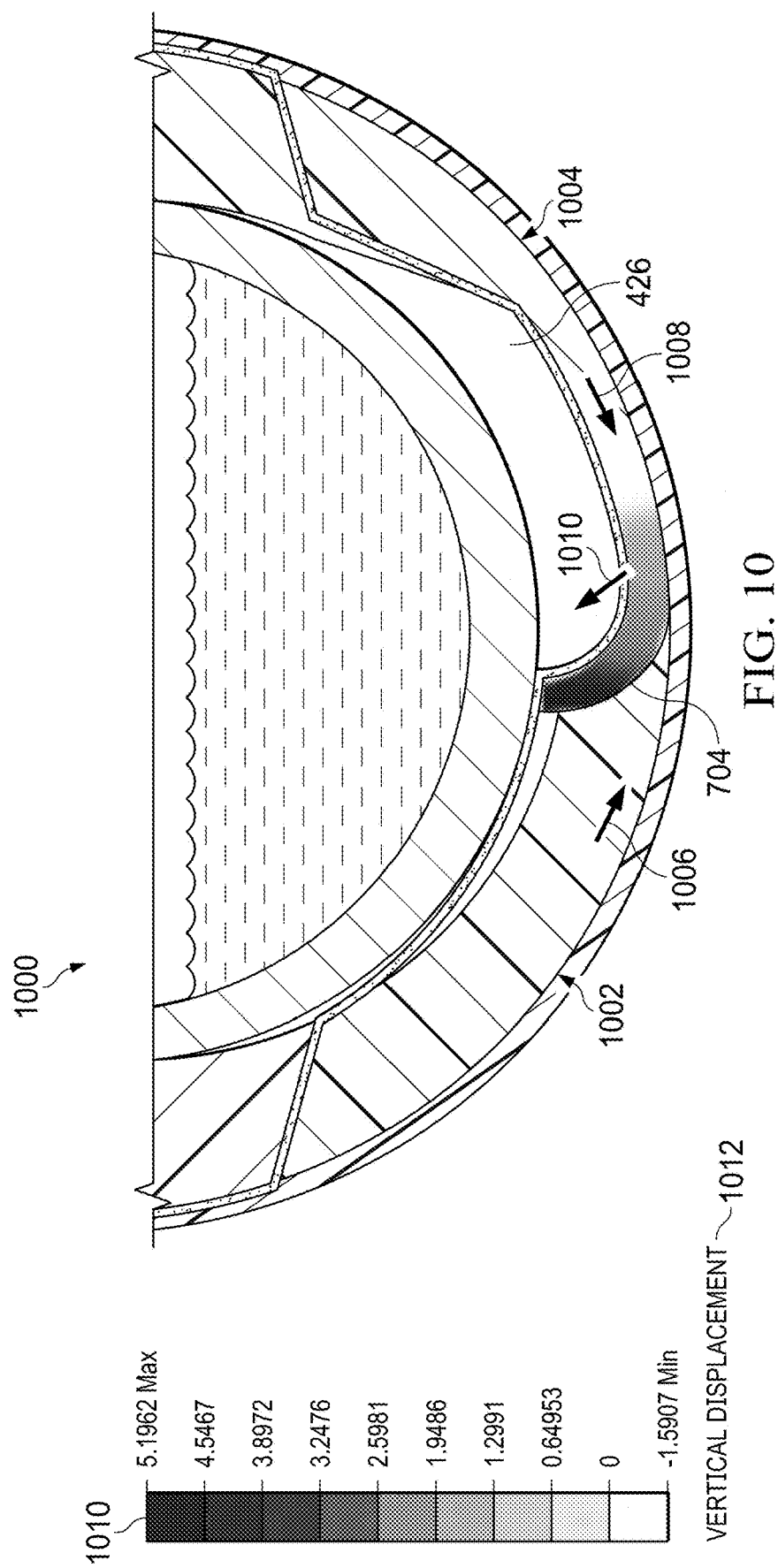
FIG. 10 is a cross-sectional view showing an example of a thermomechanical analysis of the PTE-PTD, according to some implementations of the present disclosure.

FIG. 10 is a three-dimensional view of an example of an anchoring system 500 for the PTE-PTD, according to some implementations of the present disclosure. For example, prior to installing the PTE-PTD on a pipeline, a system that includes pins 502 and a flat base with plugs 504 can be used to anchor the PTE-PTD. This anchoring system can be constructed of a stiff polymer or a ceramic material.

The PTE-PTD can be wrapped around the pipeline from the base (or underneath edge) of the pipe, closing at the top of the pipe). Once wrapped around the pipe, the PTE-PTD can be tightly assembled with the pipeline through a fixation system, such as using the pins 502 and the plugs 504. Flat bases 506 of the plugs can be fixed to the pipeline, for example, by being glued (for example, using epoxy) or welded to the pipeline.

FIG. 6 is a cross-sectional view 600 showing examples of contacts between components of the anchoring system 500 for the SMP-PTD, according to some implementations of the present disclosure. For example, layers of the components include a pipeline 602, a PU layer 604, a PET layer 606, and an epoxy shell 608. Components include a male pin 610 (for example, corresponding to the pins 502), a female pin 612 (for example, corresponding to the plugs 504), and a base 614 (for example, corresponding to the bases 506).

A PU-pipeline bond 616 connects the PU layer 604 and the pipeline 602. A PET-PU bond 618 connects the PET layer 606 and the PU layer 604. An epoxy-PET bond 620 connects the epoxy shell 608 and the PET layer 606.

Figure 11:
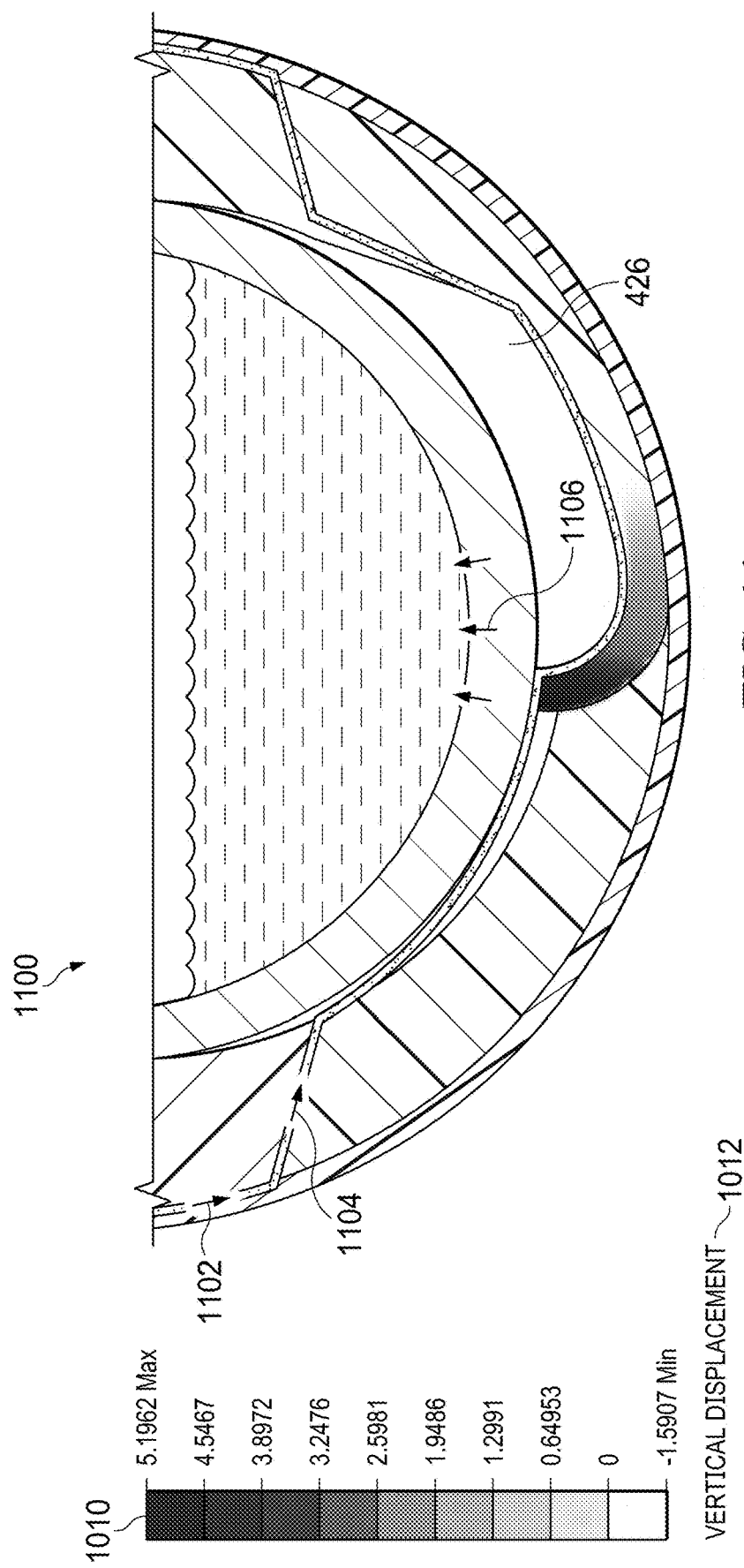
FIG. 11 is a cross-sectional view showing an example of heat transfer from the graphene web to the pipe, according to some implementations of the present disclosure.

FIG. 11 is a cross-sectional view 700 showing examples of mechanisms used for contact between a graphene web and the pipe, according to some implementations of the present disclosure. For example, an essential aspect of the PTE-PTD is configuring the PET blocks to freely expand in the circumferential direction (red arrow 702 in FIG. 7) to trigger a compression between the two layers of PET. This generates an upward movement 704 producing the desired contact between the graphene web and the steel pipe. To achieve this contact between the different components, qualities and properties of the materials are to include: 1) Epoxy-PET→low friction coefficient, 2) PET-PU→low friction coefficient, and 3) PU-steel→bonded.

To ensure this low friction between PET blocks and epoxy shell on one hand and between PET blocks and PU on the other hand, PET blocks can be coated with a thin layer of Polytetrafluoroethylene (PTFE) (or TEFLON).

Graphene can be a preferred material used as a graphene web or a graphene layer. Graphene serves as a thermal antenna of the system and therefore is essential to the PTE-PTD system.

Figure 8B:
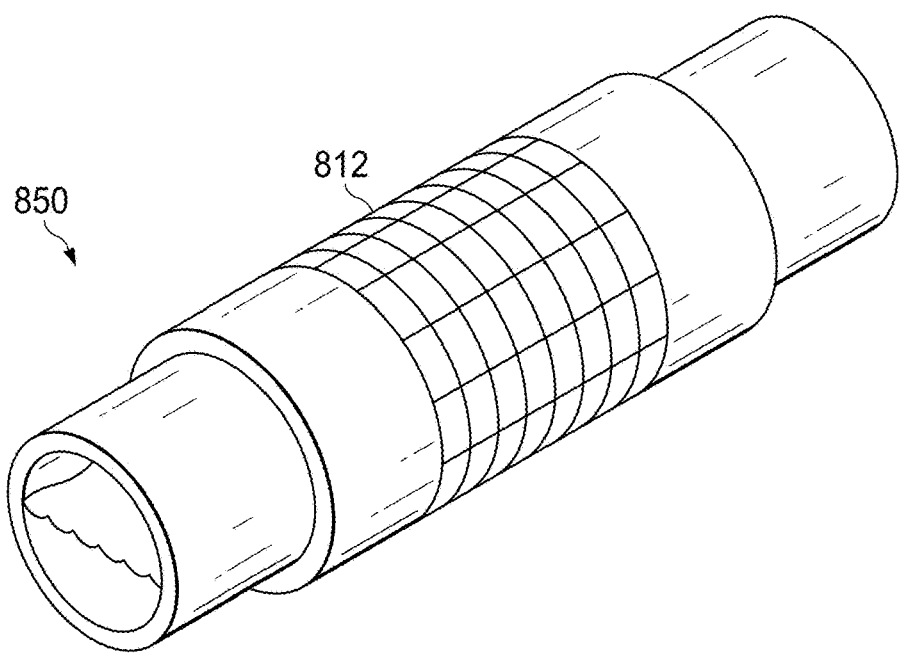

FIGS. 12A and 8B provide three-dimensional views 800, 850 illustrating an example of an installation of an external graphene web 802 around the PTE-PTD, according to some implementations of the present disclosure. The external graphene web 802 can be positioned around the pipe, so as to serve as a web. Opposite extremities 804 or edges of the graphene web can include fastening mechanisms, such as eyelets 806. The eyelets 806 can be used in combination with a plastic or metallic cable to fix the web after it has been wrapped around the PTE-PTD. A graphene web 808 can connect the internal and external webs.

When the external temperature and the sun radiations are high, the graphene web (serving as a thermal antenna, for example) can provide at least two advantages. First, graphene has an extremely high thermal conductivity, which allows conductivity to the thermal flow captured to the pipeline with minimal energy loss. Second, the natural color (black) of the graphene allows to capture sun radiations, increasing the surface temperature and therefore increasing the thermal flow transferred to the pipe.

There is no need to glue the graphene canvas onto the epoxy shell. The graphene canvas simply needs to be on contact with the other pieces of the graphene web 808 located on the left and right sides of the PTE-PTD, in order for the thermal flow to access the inside of the PTE-PTD. Operations 810 and 812 show a sequence that can be used to install the external graphene web.

The techniques of the present disclosure are able to leverage differentials of thermal expansion between two polymers to form a mechanical switch that is controlled by changes in temperature. For example, PET and Epoxy can be used as materials because they exhibit very dissimilar thermal expansion coefficients. Table 1 summarized different types of materials that can be used. Other combinations of polymers are possible.

TABLE 1

Material Properties

| Material | Young's Modulus | Poisson Ratio | Thermal Expansion | Density |
| --- | --- | --- | --- | --- |
| Polyethylene Terephthalate (PET) (for example, high thermal expansion polyethylene terephthalate) | 1050 mega-pascal (MPa) | 0.33 | 2.7e−4 K$^{-1}$ (Kelvin) | 950 kg/m$^3$ (kilograms per cubic meter) |
| Epoxy (for example, low thermal expansion epoxy such as EP30LTE-2) | 2000 MPa | 0.32 | 1.2e−5 K$^{-1}$ | 1.4 kg/m$^3$ |

Concepts associated with techniques of the present disclosure can be validated through computational analysis. In order to quantify the feasibility of the techniques, a static thermomechanical finite element analysis can be run using mechanical engineering analysis software. Thermal load is a consideration in computational analysis associated with the present disclosure. This is because during the day, the parabolic trough receiver (PTR) and the pipeline can be subjected to temperature variations corresponding to a temperature cycle, for example, typically experienced in the desert.

Figure 13:
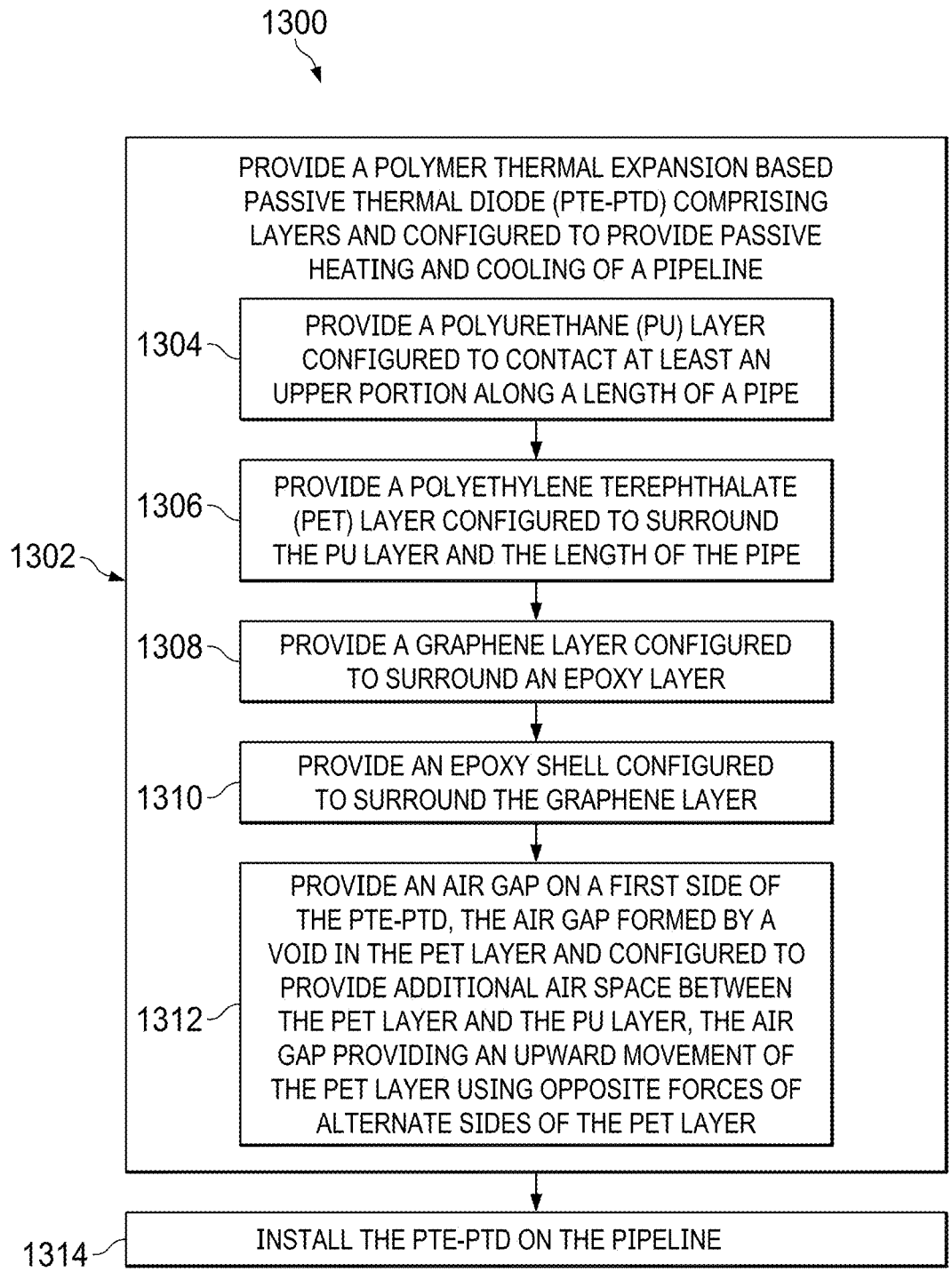
FIG. 13 is a flowchart of an example of a method for providing and installing the PTE-PTD, according to some implementations of the present disclosure.

FIG. 13 is a graph 900 showing an example of a temperature profile 902 of a diurnal cycle, according to some implementations of the present disclosure. For example, the example can apply to conditions in a desert. The temperature profile 902 is plotted relative to a time axis 904 (for example, in hours) and a temperature axis 906 (for example, in degrees Celsius (C)).

Figure 14:
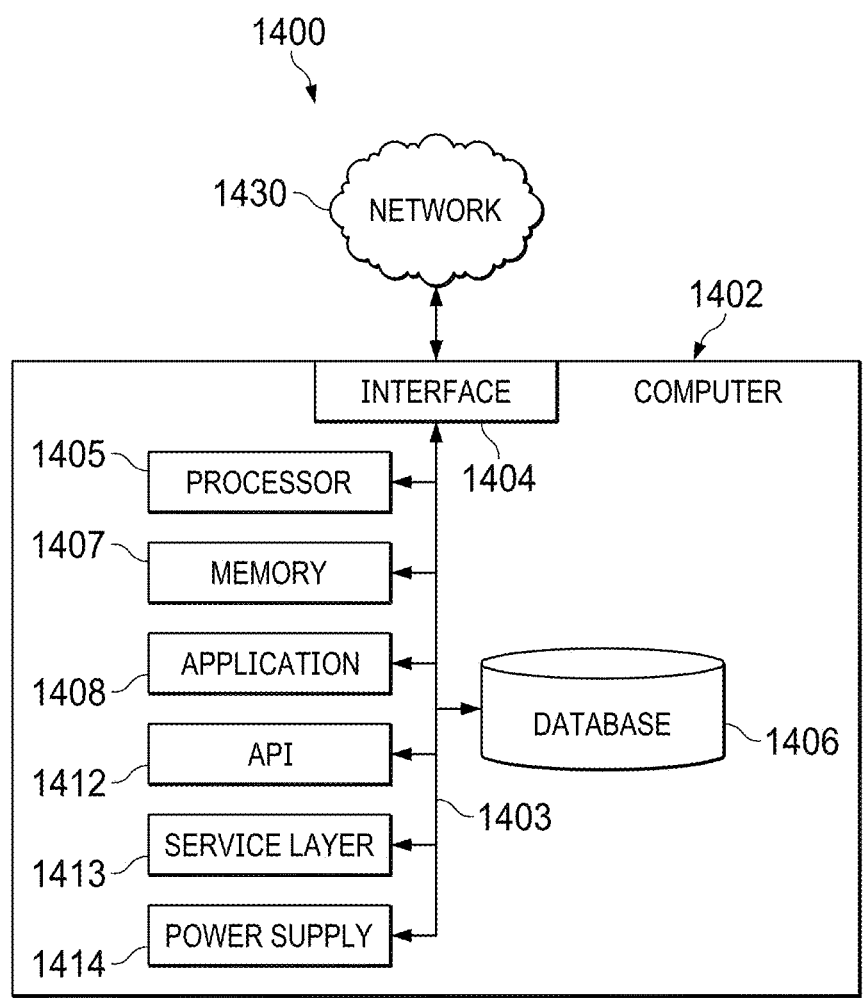
FIG. 14 is a block diagram illustrating an example computer system used to provide computational functionalities associated with described algorithms, methods, functions, processes, flows, and procedures as described in the present disclosure, according to some implementations of the present disclosure.

FIG. 14 is a cross-sectional view 1000 showing an example of a thermomechanical analysis of the PTE-PTD, according to some implementations of the present disclosure. The view 1000 reflects a structural analysis that shows that contact between the graphene web and the steel pipeline is achieved as a result of contributions of forces 1002, 1004, and the upward movement 704, shown by arrows 1006, 1008, and 1010, respectively. The forces include the left PET block pushing towards the right side, and right PET block pushing towards the left side. Also, the upward movement 704 provides an upward vertical displacement of the tip of the right PET block caused by: 1) right and left PET blocks expansion, and 2) the abutment mechanism exerted by the left PET block on the right PET block. The upward movement 704 is color-coded according to a vertical displacement key 1012.

Thermomechanical analysis has shown that thermal expansion of the system is capable of bridging a 5 mm gap, enabling the establishment of a connection between graphene web and steel pipeline. When the contact is achieved, the graphene web can transfers heat flow to the steel pipeline, allowing the fluid to absorb heat from the environment with minimum heat dissipation, as shown by arrows 1008. A key 1010 shows different levels of magnitude of forces (for example, forces 1002, 1004, and 1006) that are present in the PTE-PTD.

Figure 12:
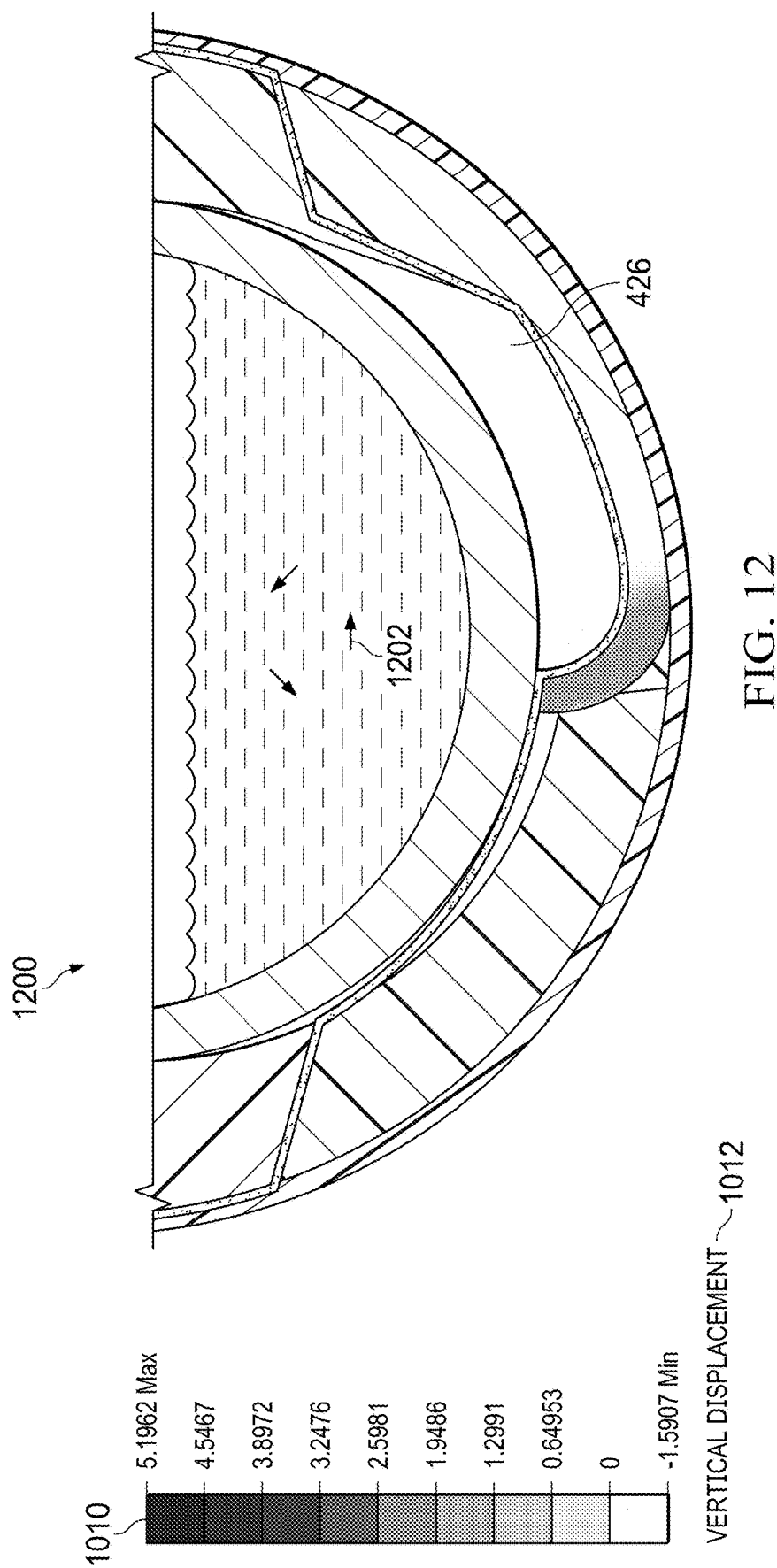
FIG. 12 is a cross-sectional view showing an example of a disconnection between the graphene web and the pipe, according to some implementations of the present disclosure.

FIG. 15 is a cross-sectional view 1100 showing an example of heat transfer from the graphene web to the pipe, according to some implementations of the present disclosure. The cross-sectional view 1100 show heat transfer when an external temperature, for example, is below 60 C. In this example, the components return to the reference position (geometry at room temperature) and contact between graphene and steel is not more established (FIG. 12). As a result, no thermal flow is transferred to the pipeline. Arrows 1102 and 1104 show heat quantity transfers from the external hot environment to the bottom of the pipeline through the graphene web. Regarding arrow 1104, cavities in the thermal diode structure allow the graphene web to cross the PET layer. Regarding arrow 1106, due to the high external temperature, the PET layer expands circumferentially and causes the graphene to make contact with the steel pipeline. The arrows symbolize the heat transfer from the graphene web to the steel pipeline.

FIG. 16 is a cross-sectional view 1200 showing an example of a disconnection between the graphene web and the pipe, according to some implementations of the present disclosure. Regarding arrows 1202, heat quantity is contained within the steel pipeline as no thermal contact is established between the graphene web and the pipeline.

FIG. 13 is a flowchart of an example of a method 1300 for providing and installing the PTE-PTD, according to some implementations of the present disclosure. In some implementations, some steps of method 1300 can be partially or completely computer-implemented. For clarity of presentation, the description that follows generally describes method 1300 in the context of the other figures in this description. However, it will be understood that method 1300 can be performed, for example, by any suitable system, environment, software, and hardware, or a combination of systems, environments, software, and hardware, as appropriate. In some implementations, various steps of method 1300 can be run in parallel, in combination, in loops, or in any order.

At 1302, a Polymer Thermal Expansion Based Passive Thermal Diode (PTE-PTD) is provided that includes layers and is configured to provide passive heating and cooling of a pipeline. The PTE-PTD includes a polyurethane (PU) layer that is configured to contact at least an upper portion along a length of a pipe. The PU layer can provide a low-friction contact with the pipe, for example. The length of the pipe can be configured to carry a transported fluid, for example, a petroleum product such as crude oil.

The PTE-PTD further includes a polyethylene terephthalate (PET) layer that is configured to surround the PU layer and the length of the pipe. The PET layer can provide low-friction contacts with the PU layer and the pipe, for example.

The PTE-PTD further includes an epoxy shell configured to surround the PET layer. The PTE-PTD further includes a graphene layer 609 that is configured to surround the epoxy shell. The PTE-PTD further includes an air gap on a first side of the PTE-PTD, the air gap formed by a void in the PET layer and configured to provide additional air space between the PET layer and the PU layer, the air gap providing an upward movement of the PET layer using opposite forces of alternate sides of the PET layer.

The PTE-PTD includes an assembly system configured to connect ends the layers along the length of the pipe. The assembly system can provide bonds between ends of the layers. The bonds can be made along the upper portion of the length of the pipe, for example. The assembly system can include pins and plugs, where the pins serve as male pins and the plugs serve as female pins.

At 1304, the PTE-PTD is installed on the pipeline. Installing the PTE-PTD onto pipeline can include driving the pins into the plugs. Bases of the plugs can be fixed to the length of the pipe. After 1314, method 1300 can stop.

In some implementations, method 1300 further includes manufacturing the PTE-PTD including manufacturing the layers to include holes at regular intervals to match placement of the pins and plugs during assembly. Installing the PTE-PTD can include attaching the bases of the plugs to the length of the pipe, installing lower layers over the plugs from a first direction, installing upper layers over the plugs from a second direction, and driving the pins into the plugs. Manufacturing and installation of the PTE-PTD can include computer-implemented techniques, including robotic techniques, for the placement and spacing of components of the PTE-PTD during either or both of the manufacturing and installation processes.

FIG. 14 is a block diagram of an example computer system 1400 used to provide computational functionalities associated with described algorithms, methods, functions, processes, flows, and procedures described in the present disclosure, according to some implementations of the present disclosure. The illustrated computer 1402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1402 can include input devices such as keypads, keyboards, and touch screens that can accept user information. Also, the computer 1402 can include output devices that can convey information associated with the operation of the computer 1402. The information can include digital data, visual data, audio information, or a combination of information. The information can be presented in a graphical user interface (UI) (or GUI).

The computer 1402 can serve in a role as a client, a network component, a server, a database, a persistency, or components of a computer system for performing the subject matter described in the present disclosure. The illustrated computer 1402 is communicably coupled with a network 1430. In some implementations, one or more components of the computer 1402 can be configured to operate within different environments, including cloud-computing-based environments, local environments, global environments, and combinations of environments.

At a top level, the computer 1402 is an electronic computing device operable to receive, transmit, process, store, and manage data and information associated with the described subject matter. According to some implementations, the computer 1402 can also include, or be communicably coupled with, an application server, an email server, a web server, a caching server, a streaming data server, or a combination of servers.

The computer 1402 can receive requests over network 1430 from a client application (for example, executing on another computer 1402). The computer 1402 can respond to the received requests by processing the received requests using software applications. Requests can also be sent to the computer 1402 from internal users (for example, from a command console), external (or third) parties, automated applications, entities, individuals, systems, and computers.

Each of the components of the computer 1402 can communicate using a system bus 1403. In some implementations, any or all of the components of the computer 1402, including hardware or software components, can interface with each other or the interface 1404 (or a combination of both) over the system bus 1403. Interfaces can use an application programming interface (API) 1412, a service layer 1413, or a combination of the API 1412 and service layer 1413. The API 1412 can include specifications for routines, data structures, and object classes. The API 1412 can be either computer-language independent or dependent. The API 1412 can refer to a complete interface, a single function, or a set of APIs.

The service layer 1413 can provide software services to the computer 1402 and other components (whether illustrated or not) that are communicably coupled to the computer 1402. The functionality of the computer 1402 can be accessible for all service consumers using this service layer. Software services, such as those provided by the service layer 1413, can provide reusable, defined functionalities through a defined interface. For example, the interface can be software written in JAVA, C++, or a language providing data in extensible markup language (XML) format. While illustrated as an integrated component of the computer 1402, in alternative implementations, the API 1412 or the service layer 1413 can be stand-alone components in relation to other components of the computer 1402 and other components communicably coupled to the computer 1402. Moreover, any or all parts of the API 1412 or the service layer 1413 can be implemented as child or sub-modules of another software module, enterprise application, or hardware module without departing from the scope of the present disclosure.

The computer 1402 includes an interface 1404. Although illustrated as a single interface 1404 in FIG. 14, two or more interfaces 1404 can be used according to particular needs, desires, or particular implementations of the computer 1402 and the described functionality. The interface 1404 can be used by the computer 1402 for communicating with other systems that are connected to the network 1430 (whether illustrated or not) in a distributed environment. Generally, the interface 1404 can include, or be implemented using, logic encoded in software or hardware (or a combination of software and hardware) operable to communicate with the network 1430. More specifically, the interface 1404 can include software supporting one or more communication protocols associated with communications. As such, the network 1430 or the interface's hardware can be operable to communicate physical signals within and outside of the illustrated computer 1402.

The computer 1402 includes a processor 1405. Although illustrated as a single processor 1405 in FIG. 14, two or more processors 1405 can be used according to particular needs, desires, or particular implementations of the computer 1402 and the described functionality. Generally, the processor 1405 can execute instructions and can manipulate data to perform the operations of the computer 1402, including operations using algorithms, methods, functions, processes, flows, and procedures as described in the present disclosure.

The computer 1402 also includes a database 1406 that can hold data for the computer 1402 and other components connected to the network 1430 (whether illustrated or not). For example, database 1406 can be an in-memory, conventional, or a database storing data consistent with the present disclosure. In some implementations, database 1406 can be a combination of two or more different database types (for example, hybrid in-memory and conventional databases) according to particular needs, desires, or particular implementations of the computer 1402 and the described functionality. Although illustrated as a single database 1406 in FIG. 14, two or more databases (of the same, different, or combination of types) can be used according to particular needs, desires, or particular implementations of the computer 1402 and the described functionality. While database 1406 is illustrated as an internal component of the computer 1402, in alternative implementations, database 1406 can be external to the computer 1402.

The computer 1402 also includes a memory 1407 that can hold data for the computer 1402 or a combination of components connected to the network 1430 (whether illustrated or not). Memory 1407 can store any data consistent with the present disclosure. In some implementations, memory 1407 can be a combination of two or more different types of memory (for example, a combination of semiconductor and magnetic storage) according to particular needs, desires, or particular implementations of the computer 1402 and the described functionality. Although illustrated as a single memory 1407 in FIG. 14, two or more memories 1407 (of the same, different, or combination of types) can be used according to particular needs, desires, or particular implementations of the computer 1402 and the described functionality. While memory 1407 is illustrated as an internal component of the computer 1402, in alternative implementations, memory 1407 can be external to the computer 1402.

The application 1408 can be an algorithmic software engine providing functionality according to particular needs, desires, or particular implementations of the computer 1402 and the described functionality. For example, application 1408 can serve as one or more components, modules, or applications. Further, although illustrated as a single application 1408, the application 1408 can be implemented as multiple applications 1408 on the computer 1402. In addition, although illustrated as internal to the computer 1402, in alternative implementations, the application 1408 can be external to the computer 1402.

The computer 1402 can also include a power supply 1414. The power supply 1414 can include a rechargeable or non-rechargeable battery that can be configured to be either user- or non-user-replaceable. In some implementations, the power supply 1414 can include power-conversion and management circuits, including recharging, standby, and power management functionalities. In some implementations, the power-supply 1414 can include a power plug to allow the computer 1402 to be plugged into a wall socket or a power source to, for example, power the computer 1402 or recharge a rechargeable battery.

There can be any number of computers 1402 associated with, or external to, a computer system containing computer 1402, with each computer 1402 communicating over network 1430. Further, the terms "client," "user," and other appropriate terminology can be used interchangeably, as appropriate, without departing from the scope of the present disclosure. Moreover, the present disclosure contemplates that many users can use one computer 1402 and one user can use multiple computers 1402.

Described implementations of the subject matter can include one or more features, alone or in combination.

For example, in a first implementation, an apparatus includes layers including: a polyurethane (PU) layer configured to contact at least an upper portion along a length of a pipe; a polyethylene terephthalate (PET) layer configured to surround the PU layer and the length of the pipe; an epoxy shell configured to surround the PET layer; and a graphene layer configured to surround the epoxy shell. The apparatus also includes an air gap on a first side of the PTE-PTD, the air gap formed by a void in the PET layer and configured to provide additional air space between the PET layer and the PU layer, the air gap providing an upward movement of the PET layer using opposite forces of alternate sides of the PET layer.

The foregoing and other described implementations can each, optionally, include one or more of the following features:

A first feature, combinable with any of the following features, where the PU layer provides a low-friction contact with the pipe.

A second feature, combinable with any of the previous or following features, where the PET layer provides low-friction contacts with the PU layer and the pipe.

A third feature, combinable with any of the previous or following features, where the length of the pipe is configured to carry a transported fluid.

A fourth feature, combinable with any of the previous or following features, the apparatus further including an assembly system configured to connect ends the layers along the length of the pipe.

A fifth feature, combinable with any of the previous or following features, where the assembly system provides bonds between ends of the layers, the bonds along the upper portion of the length of the pipe.

A sixth feature, combinable with any of the previous or following features, where the assembly system includes pins and plugs, where the pins serve as male pins and the plugs serve as female pins, and where assembling the apparatus onto the length of the pipe includes driving the pins into the plugs.

A seventh feature, combinable with any of the previous or following features, bases of the plugs are fixed to the length of the pipe.

An eighth feature, combinable with any of the previous or following features, where the layers are manufactured with holes at regular intervals to match placement of the pins and plugs during assembly.

A ninth feature, combinable with any of the previous or following features, where installation of the apparatus includes: attaching the bases of the plugs to the length of the pipe; installing lower layers over the plugs from a first direction; installing upper layers over the plugs from a second direction; and driving the pins into the plugs.

In a second implementation, a method includes the following. A Polymer Thermal Expansion Based Passive Thermal Diode (PTE-PTD) apparatus is provided that includes layers and is configured to provide passive heating and cooling of a pipeline. A polyurethane (PU) layer is provided that is configured to contact at least an upper portion along a length of a pipe. A polyethylene terephthalate (PET) layer is provided that is configured to surround the PU layer and the length of the pipe. A graphene layer is provided that is configured to surround an epoxy layer. An epoxy shell is provided that is configured to surround the graphene layer. An air gap on a first side of the PTE-PTD is provided. The air gap is formed by a void in the PET layer and is configured to provide additional air space between the PET layer and the PU layer. The air gap provides an upward movement of the PET layer using opposite forces of alternate sides of the PET layer. The PTE-PTD is installed on the pipeline.

The foregoing and other described implementations can each, optionally, include one or more of the following features:

A first feature, combinable with any of the previous or following features, where the PU layer provides a low-friction contact with the pipe.

A second feature, combinable with any of the previous or following features, where the PET layer provides low-friction contacts with the PU layer and the pipe.

A third feature, combinable with any of the previous or following features, where the length of the pipe is configured to carry a transported fluid.

A fourth feature, combinable with any of the previous or following features, the method further comprising an assembly system configured to connect ends the layers along the length of the pipe.

A fifth feature, combinable with any of the previous or following features, where the assembly system provides bonds between ends of the layers, the bonds along the upper portion of the length of the pipe.

A sixth feature, combinable with any of the previous or following features, where the assembly system includes pins and plugs, where the pins serve as male pins and the plugs serve as female pins, and where installing PTE-PTD onto pipeline includes driving the pins into the plugs.

A seventh feature, combinable with any of the previous or following features, where bases of the plugs are fixed to the length of the pipe.

An eighth feature, combinable with any of the previous or following features, the method further including manufacturing the PTE-PTD including manufacturing the layers to include holes at regular intervals to match placement of the pins and plugs during assembly.

A ninth feature, combinable with any of the previous or following features, where installing the PTE-PTD includes: attaching the bases of the plugs to the length of the pipe; installing lower layers over the plugs from a first direction; installing upper layers over the plugs from a second direction; and driving the pins into the plugs.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least one apparatus and at least one method (including, for example, a computer-implemented method), and a computer system including a computer memory interoperably coupled with a hardware processor configured to perform the computer-implemented method or the instructions stored on a non-transitory, computer-readable medium.

What is claimed is:
1. An apparatus, comprising:
 a Polymer Thermal Expansion Based Passive Thermal Diode (PTE-PTD), including layers comprising:
  a polyurethane (PU) layer configured to contact at least an upper portion along a length of a pipe;
  a polyethylene terephthalate (PET) layer configured to surround the PU layer and the length of the pipe;
  an epoxy shell configured to surround the PET layer; and
  a graphene layer configured to surround the epoxy shell, and an air gap on a first side of the PTE-PTD, the air gap formed by a void in the PET layer and configured to provide additional air space between the PET layer and the PU layer, the air gap providing an upward movement of the PET layer using opposite forces of alternate sides of the PET layer.

2. The apparatus of claim 1, wherein the PU layer provides a low-friction contact with the pipe.

3. The apparatus of claim 1, wherein the PET layer provides low-friction contacts with the PU layer and the pipe.

4. The apparatus of claim 1, wherein the length of the pipe is configured to carry a transported fluid.

5. The apparatus of claim 1, further comprising an assembly system configured to connect ends the layers along the length of the pipe.

6. The apparatus of claim 5, wherein the assembly system provides bonds between ends of the layers, the bonds along the upper portion of the length of the pipe.

7. The apparatus of claim 5, wherein the assembly system includes pins and plugs, wherein the pins serve as male pins and the plugs serve as female pins, and wherein assembling the apparatus onto the length of the pipe includes driving the pins into the plugs.

8. The apparatus of claim 7, wherein bases of the plugs are fixed to the length of the pipe.

9. The apparatus of claim 7, wherein the layers are manufactured with holes at regular intervals to match placement of the pins and plugs during assembly.

10. The apparatus of claim 8, wherein installation of the apparatus includes:
    attaching the bases of the plugs to the length of the pipe;
    installing lower layers over the plugs from a first direction;
    installing upper layers over the plugs from a second direction; and
    driving the pins into the plugs.

11. A method, comprising:
    providing a Polymer Thermal Expansion Based Passive Thermal Diode (PTE-PTD) comprising layers and configured to provide passive heating and cooling of a pipeline, including:
        providing a polyurethane (PU) layer configured to contact at least an upper portion along a length of a pipe;
        providing a polyethylene terephthalate (PET) layer configured to surround the PU layer and the length of the pipe;
        providing an epoxy shell configured to surround the PET layer;
        providing a graphene layer configured to surround the epoxy shell; and
        providing an air gap on a first side of the PTE-PTD, the air gap formed by a void in the PET layer and configured to provide additional air space between the PET layer and the PU layer, and providing an upward movement of the PET layer using opposite forces of alternate sides of the PET layer; and
    installing the PTE-PTD on the pipeline.

12. The method of claim 11, wherein the PU layer provides a low-friction contact with the pipe.

13. The method of claim 11, wherein the PET layer provides low-friction contacts with the PU layer and the pipe.

14. The method of claim 11, wherein the length of the pipe is configured to carry a transported fluid.

15. The method of claim 11, the PTE-PTD further comprising an assembly system configured to connect ends the layers along the length of the pipe.

16. The method of claim 15, wherein the assembly system provides bonds between ends of the layers, the bonds along the upper portion of the length of the pipe.

17. The method of claim 15, wherein the assembly system includes pins and plugs, wherein the pins serve as male pins and the plugs serve as female pins, and wherein installing PTE-PTD onto pipeline includes driving the pins into the plugs.

18. The method of claim 17, wherein bases of the plugs are fixed to the length of the pipe.

19. The method of claim 17, further comprising manufacturing the PTE-PTD including manufacturing the layers to include holes at regular intervals to match placement of the pins and plugs during assembly.

20. The method of claim 18, wherein installing the PTE-PTD includes:
    attaching the bases of the plugs to the length of the pipe;
    installing lower layers over the plugs from a first direction;
    installing upper layers over the plugs from a second direction; and
    driving the pins into the plugs.

* * * * *